April 30, 1963  C. J. FRANKLIN  3,087,274
FISH LURE
Filed Aug. 29, 1961
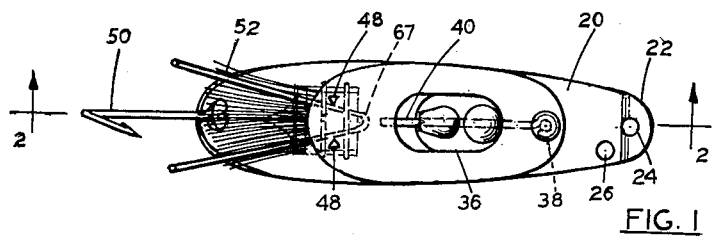
FIG. 1
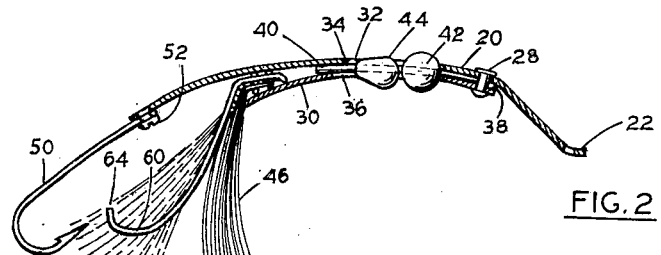
FIG. 2
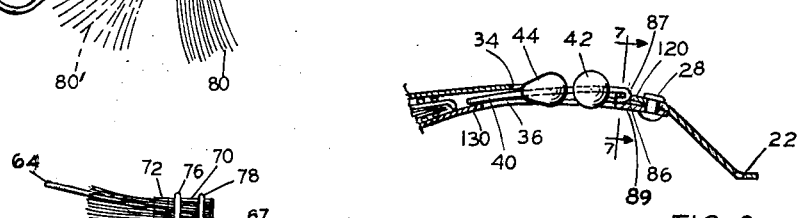
FIG. 6
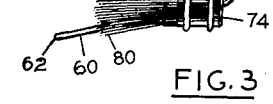
FIG. 3
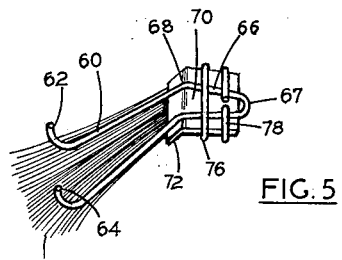
FIG. 5
FIG. 4
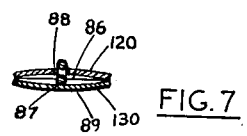
FIG. 7
INVENTOR.
CHARLES. J. FRANKLIN
BY
ATTORNEY `United States Patent Office`

3,087,274
Patented Apr. 30, 1963

3,087,274
FISH LURE
Charles J. Franklin, 377 Merchants Road,
Rochester, N.Y.
Filed Aug. 29, 1961, Ser. No. 134,599
5 Claims. (Cl. 43—42.28)

This invention relates to fish lures, and more particularly to a spoon type fish lure having concealed provision for avoiding fouling of the hook by weeds.

The present invention is an improvement over a fish lure disclosed in Franklin U.S. Patent #2,728,160 issued December 7, 1955, wherein there is diclosed a fish lure provided with clamp plates for releasably holding a feather cluster trailing in the region of a cluster hook, and a further improvement over provision for protecting the hook from becoming fouled by weeds, as disclosed in my copending application Serial #852,886, filed November 13, 1959.

The present invention is directed to a fish lure comprising clamp plates between which a feather cluster and hook guard assembly is releasably held, and wherein the assembly comprises a feather cluster and hook anti-fouling means, which together with the hook, are simultaneously concealed by the cluster of feathers. The cluster of feathers or splay of stiff hairs, such as a bucktail cluster are formed as an integral part of the removable hook anti-fouling cluster assembly. The anti-fouling means, with the concealing cluster or splay may be employed in conjunction with the spoon disclosed in 2,728,160 to render the same anti-fouling, or in conjunction with the single hook spoon herein disclosed, the cluster in either case being appropriately supported for maximum hiding effect over the hook anti-fouling means as well as the hook itself.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 1 is a plan view of the lure from what may be termed its top side with the cluster and hook guard assembly in place;

FIGURE 2 is a longitudinal sectional view taken on the line 2—2 of FIGURE 1 and in inverted position;

FIGURE 3 is a top plan view of a cluster and guard assembly removed from the spoon clamp;

FIGURE 4 is a side elevational view of the assembly of FIGURE 3;

FIGURE 5 is a view of the side and bottom of the assembly of FIGURE 3;

FIGURE 6 is a fragmentary longitudinal sectional view of a modified form, and

FIGURE 7 is a section taken on the line 7—7 of FIGURE 6.

Referring to the drawings, there is shown a thin contoured plate 20 having an offset 22 at its leader end, in which are provided leader apertures 24 and 26, the former to provide a wobble motion, and the latter to provide a spinning motion when trolling or the like. Affixed to the central body portion of the plate, as by a rivet 28, is a clamp plate 30 made of thin sheet material. The plates 20 and 30 may be formed of resilient material such as berillium copper sheet. The plate 20 has a slot 32 formed therein terminating in an angular cam lip 34, while the plate 30 has a slot 36 of about the same width as the slot 32, but extending further to the rear and beyond the rear end of the slot 32 and cam 34.

Secured between the plates and about the rivet 28 is an eye 38 of a rearwardly extending stiff wire 40, on which is slidably disposed two glass beads 42 and 44, the forward bead 42 being round, and the rear head being slightly ovoid or pear-shaped as shown. The round bead 42 provides a thumb hold in respect thereto for sliding the beads along the wire 40, within the slot 36. The smaller end of the ovoid bead 44 is adapted to slide up upon the cam 34 to spread the plates, whereby a feather cluster and hook guard assembly, 46, clamped between the rear end of plate 30, and the body portion of plate 20 may be released and removed or a new or different one inserted. The cluster and guard assembly is held between the plates by spring pressure, when the beads are in the position shown, and struck-in teeth 48 upon the plate 30 assist in the grip.

At the trailing end of the plate 20 is secured a snare or hook 50 as by a rivet 52. In order to protect the hook from fouling in weeds, and in order to hide or screen the hook, and the protecting means, a cluster guard assembly is provided as at 46, which is detachably secured to the spoon between the plates 20 and 30. Such assembly comprises a stiff resilient wire 60 formed as a V, the free ends of which are inwardly curved as at 62 and 64, the ends extending angularly from a short flat portion 66 of the V adjacent the bend 67 thereof as at 68. Lying upon the flat portion is a rectangular sheet 70 of water proof or water resistant material such as thin sheet plastic, the material 70 being wider than the flat portion 66, and longer than the flat portion. The material so lies upon the flat portion so as to provide an end portion 72 bent or folded up to conform with the shape of the guard wires, beyond the bends 68 thereof. Overlying the sheet material are the ends 74 of feathers or bucktail hairs. The sheet material and feathers or bucktail hair ends may be secured in place by a pair of oppositely disposed wire staple like clamps 76 and 78. The wire bends at 68 hold the end portion 72 folded up, so that the trailing cluster is caused to project for the most part forward of the guard wires, and the hook guard ends 62 and 64 thereof.

When the cluster guard assembly is clamped in place, the guard wire ends are disposed in protecting relation to the hook, on opposite sides of the hook to ward off weeds, or cause the hook to veer and clear a weed. The cluster, while described as for the most part projecting forward of the guard wires, are, while in use, caused to trail rearwardly as the lure is drawn through the water by the water streaming by and thereby engulf and hide the guard wire ends 62 and 64 and the hook 50, whereby to render the lure effective as a fish snare, the hook and guard wires being in effect hidden or screened from the view of the prospective catch, as indicated by the cluster ends 80'.

In practice the beads 42 and 44 may be colored to provide attraction and the rectangular sheet material 70 may be brightly colored to provide additional attraction.

As to the cluster, the feathers or hair 80 thereof may be variously colored to enhance the lure effect, and various combinations of feathers and hair may also be employed.

It will be seen that the cluster guard assembly may be readily removed and replaced by another having a different cluster arrangement or color effect as may be thought to be desirable. It will also be seen that in replacing the cluster and guard assembly, the wires bent as at 68 and the fold in the plastic sheet seated in the bend at 68 provide a stop or shoulder to engage the tip end of the plate 30, so that in replacing the cluster guard assembly, the assembly is accurately located in each instance so that the proper relation of the guard and cluster screen to the hook is assured.

In the modified form of FIGURE 6, and 7, the wire on which the camming beads 42 and 44 slide, instead of being relatively rigidly bound around the rivet, is hooked in an aperture 86 in the plate 120, and the plates 120 and 130 are dished slightly as at 88 and 89 to provide space between the plates for the hook end 87. The shank portion 40 of the wire will be seen to extend from the outer side of the plate 120, to a point between the plates 120 and 130 beyond the slot 36. The inclination of the wire shank, more closely conforms to the angle of the plate cam 34, and the lid spreading action resulting from sliding the beads to the left to the end of the slot 36, is facilitated, it being unnecessary to spring the wire, as in FIGURES 1 and 2, since the hook 87 provides a somewhat hinged connection.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A fish lure comprising an elongated resilient plate having a body portion, means at one end for leader attachment, and a barbed hook extending rearward from the other end, a second plate attached to the body portion at a point adjacent the forward end of the body portion, said second plate extending rearwardly and overlying a substantial part of the body portion, means between the rearward portion of the second plate and the portion of the first plate underlying the second plate to grip a feather cluster and hook guard assembly, and a feather cluster and hook guard assembly having its forward end disposed between the gripping means and said assembly having guard wire means extending rearwardly toward the region of the hook barb and a feather cluster of a length sufficient to hide the guard means and hook barb.

2. A fish lure comprising an elongated thin plate having a body portion, means at one end for leader attachment, and a barbed hook extending rearward from the other end, a second thin plate attached to the body portion at a point adjacent the forward end of the body portion, said second plate extending rearwardly and overlying a substantial part of the body portion, means between the rearward portion of the second plate and the portion of the first plate underlying the second plate to resiliently grip a feather cluster and hook guard assembly, and a feather cluster and hook guard assembly having its forward end disposed between the gripping means and said assembly having a pair of guard wires extending rearwardly toward the region of the hook barb and a feather cluster extending rearwardly and of a length sufficient to hide the guard means and hook barb.

3. A feather cluster and hook guard assembly adapted to be clamped upon a fish lure having a barbed hook, said assembly being adapted to conceal the hook from a prospective catch and guard the hook from weed entanglement, said assembly comprising an elongated section of resilient wire in the form of a V, having forward adjacent portions adjacent the V bend lying substantially in one plane, and the trailing end portions angularly disposed from the plane, with the extreme ends inwardly curved toward the plane of the forward portions, a section of water resistant sheet material having a first portion lying upon forward portions of the wire, and a second portion disposed angularly thereto and lying on the inside portion of the angularly disposed portions of the wires immediately beyond the planar portions thereof, a cluster of feathers having their root ends mounted on the first portion of the sheet material, with their trailing ends lying against the second portion and of a length greater than the inwardly curved ends of the guard wires, and means to permanently secure the planar portion of said wires, the first portion of said sheet material and root ends as an assembly.

4. A feather cluster and guard assembly adapted to be clamped upon a fish lure having a barbed hook, said assembly being adapted to conceal the hook from a prospective catch and guard the hook from weed entanglement, said assembly comprising an elongated section of resilient wire in the form of a V, having forward adjacent portions adjacent the V bend lying substantially in one plane, and the trailing end portions angularly disposed from the plane, with the extreme ends inwardly curved toward the plane of the forward portions, a section of water resistant sheet material having a first portion lying upon forward portions of the wire, and a second portion disposed angularly thereto and lying on the inside portion of the angularly disposed portions of the wires immediately beyond the planar portions thereof, a cluster of feathers having their root ends mounted on the first portion of the sheet material, with their trailing ends lying against the second portion and of a length greater than the inwardly curved ends of the guard wires, and binding wires extending around the planar portion of said wires, the first portion of sheet material and the root ends to provide a permanent assembly thereof to provide a flat tongue portion to be received between lure clamping members, and an angularly disposed shoulder portion for engaging one of the clamping members.

5. A fish lure comprising an elongated resilient plate having a body portion and a lengthwise extending slot therein, means at one end for leader attachment, and a barbed hook extending rearwardly from the other end, a second plate attached to the body portion at a point adjacent the forward end of the body portion, said second plate extending rearwardly and overlying a substantial part of the body portion and having a slot of greater length extending rearwardly beyond the first named slot, a wire having a slidable bead thereon, extending rearwardly between the plates and beyond the ends of the slots, and hooked from the exterior in the first named plate forward of the slot therein for spreading the plates on sliding the bead to the end of the slot of greater length, means between the rearward portion of the second plate, and the portion of the first plate underlying the second plate to grip a feather cluster and hook guard assembly, and a feather cluster and hook guard assembly having its forward end disposed between the gripping means, and said assembly having guard wire means extending rearwardly toward the region of the hook barb and a feather cluster of a length sufficient to hide the guard means and hook barb.

References Cited in the file of this patent
UNITED STATES PATENTS

| | | |
|---|---|---|
| 2,219,225 | Gambill | Oct. 22, 1940 |
| 2,319,026 | Adam | May 11, 1943 |
| 2,728,160 | Franklin | Dec. 27, 1955 |